Oct. 25, 1960  R. D. HARDY  2,958,067

WIRE CLAMP

Filed Nov. 17, 1958

INVENTOR:
ROBERT D. HARDY

By Sutherland, Polster & Taylor
ATTORNEYS.

United States Patent Office 2,958,067
Patented Oct. 25, 1960

2,958,067
WIRE CLAMP

Robert D. Hardy, Pharr, Tex., assignor to James R. Kearney Corporation, St. Louis, Mo., a corporation of Delaware Filed Nov. 17, 1958, Ser. No. 774,349

2 Claims. (Cl. 339—109)

This invention concerns hot line clamps, and particularly clamps of the type useful in making a temporary connection between energized electric lines during the installation of a permanent connector.

It is often necessary as a result of mechanical failure of an electric wire, or as a result of severe weather conditions or other causes occasioning the breaking of a line at a junction, to reconnect together a pair of electric lines under conditions where current will begin to flow between the two lines the moment they touch each other. Also, it is sometimes necessary to replace a permanent connector tying together two energized lines. Under such conditions, the arcing resulting from the lines being separated after they have once touched makes it impossible to install a satisfactory connection without the wires being temporarily held in firm electrical contact at a point remote from the connector during the entire installing operation.

It is the purpose of my invention to provide a simple re-useable clamp for establishing a temporary connection between two energized electric lines.

It is a further objetc of my invention to provide a service tap clamp which can be easily assembled with any desired broken or continuous wire on the ground, easily, firmly and rapidly connected with a continuous line wire, and easily removed from both wires after a permanent connection between them has been completed.

Figure 1:
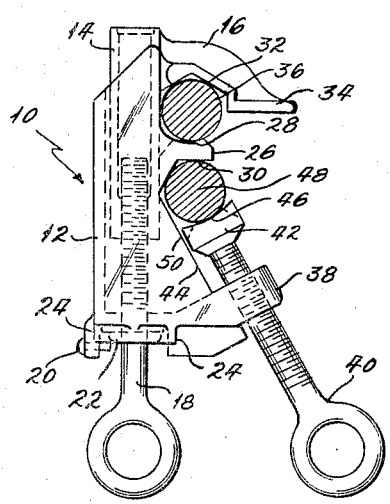
Figure 2:
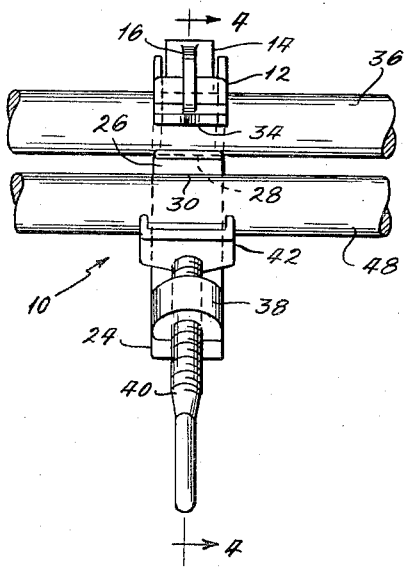
Figure 3:
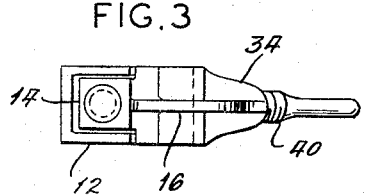
Figure 4:
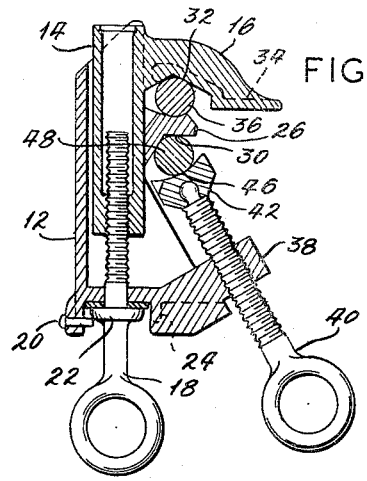

These and other advantages of my invention will be readily apparent from the following description taken in connection with the attached drawings in which:

Figure 1 is a side view of the clamp of my invention;
Figure 2 is a front view of the clamp;
Figure 3 is a plan view of the clamp; and
Figure 4 is a section of the clamp along line 4—4 of Figure 2.

My clamp generally comprises an electrically conducting hollow body in which a hook member can slide up and down. The hook member is equipped with a contact surface which can be hooked over a main line wire and which cooperates with a contact surface of the body of the clamp to hold a main line wire in firm electrical contact with the clamp when the hook member is drawn down into the body of the clamp by means of a first eye bolt. The body of the clamp has a second contact surface immediately below the contact surface designed to engage the main line wire, and the second contact surface cooperates with a movable clamping member which can be moved toward and away from the second contact surface by a second eye bolt. The eye bolts are inclined with respect to each other so that they can be easily separately manipulated. The inclination of the second eye bolt and the position of the second contact surface are such that when a service tap or other wire is firmly held between the movable clamp member and the second contact surface of the body, the service tap wire will be directly below and parallel to the main line wire, spaced therefrom by a distance which will facilitate the installation of a compression connector in the vicinity of the clamp for permanently connecting the wires together. After the wires have been permanently connected together and the connection is ready to assume the electrical load, the clamp can be easily removed by turning both eye bolts until the clamp member and the hook member come clear of the wires, whereupon the clamp can be easily sliped out from between the wires by a short rearward motion.

Referring now to Figure 1, the clamp of my invention is generally shown at 10. The body 12 of the clamp slidably receives therein the slide 14 of the hook member 16. The slide 14 is secured within the body 12 of the clamp 10 by an eye bolt 18 which screwthreadedly engages the slide 14, and which can be readily turned by hand or, if necessary, by a standard insulated clamping stick. The eye bolt 18 is held in a fixed position with respect to body 12 by a rivet 20 engaging a shoulder 22 of the eye bolt so as to allow rotary movement thereof, but prevent longitudinal movement of the bolt 18. Flanges 24 secure the bolt 18 against lateral movement.

The body 12 of the clamp has formed at the center of its forward portion a shoulder 26 which has a generally concave contact surface 28 on its upper side and another generally concave surface 30 on its underside. Hook member 16 has a generally concave contact surface on its underside at 32, and the elongated nose 34 of hook member 16 serves to keep the hook member 16 from sliding off a main line wire 36 over which it is hooked.

At its lower forward portion, body 12 has an inclined flange 38 in which a second eye bolt 40 is screwthreadedly mounted. Like bolt 18, bolt 42 can be readily turned either by hand or, if necessary to prevent electrical shock, by a standard insulated clamping stick. A clamp member 42 is mounted on the end of bolt 40 for free rotary movement with respect to bolt 40 so that clamp member 42 is constrained to move longitudinally with the tip of bolt 40, but can acomplish this motion without rotating. The clamp member 42 is prevented from rotating during its motion by the inclined face 44 of body 12, against which it butts. Clamp member 42 has formed at its upper end an inclined generally concave contact surface 46 which cooperates with the similarly inclined contact surface 30 on shoulder 26 of body 12 to hold firmly between them a service tap wire 48 to be connected. Clamp member 42 is provided with ears 50 to prevent wire 48 from sliding off of it sideways.

In operation, when it is desired, for example, to reconnect a fallen service tap line to a current-carrying main line, the service tap wire 48 is first inserted into the clamp on the ground, and bolt 40 is turned by hand until wire 48 becomes firmly caught between contact surfaces 30 and 46 at a point sufficiently remote from the end of wire 48 to permit installation of a permanent connector on the free end of wire 48. Bolts 18 is then unscrewed until the hook member 16 is in its uppermost position. In this condition, the eye of bolt 18 is inserted in the head of an insulated clamping stick (not shown) and the clamp 10, together with wire 48, is raised up to the main line wire 36 and the hook member 16 is hooked over wire 36. Bolt 18 is then rotated by means of the clamping stick so as to draw the body 12 upward until contact surface 28 of shoulder 26 comes into contact with wire 36 and a firm mechanical and electrical connection is established between the clamp 10 and the wire 36. In this condition, the entire electrical and mechanical load is carried by clamp 10 so that a permanent connector can be installed between the wires 36 and 48 adjacent the clamp 10 without fear of arcing or electrical shock. The clamping stick is of standard construction and serves merely to grip the eye of the bolt 18 through the intermediary of an insulated bar, as the voltages involved make it dangerous to touch the clamp while it is in contact with an energized wire.

When the permanent connection has been made, bolt 40 is first unscrewed by means of an insulated clamping stick (not shown) so as to pull clamp member 42 out of engagement with wire 48. Bolt 18 is then unscrewed, also by means of an insulated clamping stick, until the hook member 16 has been raised high enough so that nose 34 will amply clear wire 36. In this condition, the clamp 10 can be pulled out from between wires 36 and 48 by a slight rearward movement due to the inclination of contact surface 30. The clamp 10 is then ready for another operation.

If my clamp is used to make a temporary connection while an existing connector is replaced, it can be slipped between the wires adjacent the old connector and tightened by means of a pair of clamping sticks. The old connection is then severed and replaced by a new one while the wires are firmly held in electrical connection by the clamp. When the new connector has been installed, the clamp can be removed as described above.

It will be seen that I have provided a simple clamp for temporarily connecting a pair of wires during the installation of a permanent connector. It will be readily apparent that other embodiments of my invention than the one shown and described herein can be devised to fit the needs of a particular situation, and I therefore do not desire to limit myself except by the scope of the following claims.

Having thus described the invention, what is claimed and desired to be secured by Letters Patent is:

1. A portable type of clamp for securing a pair of wire conductors or the like in parallel arrangement at a portion thereof intermediate their ends, said clamp comprising a fixed shoulder, means forming a pair of spaced substantially parallel contact surfaces one of which is on one side of said shoulder to receive a conductor, means on said clamp mounting said means forming said pair of contact surfaces in opposed relation, and for relative movement toward and away from one another, means forming a second pair of spaced substantially parallel contact surfaces one of which is on the other side of said shoulder to receive a second conductor, means on said clamp mounting said means forming said second pair of contact surfaces in opposed relation, parallel to said first mentioned pair of contact surfaces, and for relative movement toward and away from one another, said clamp including separate manually operable means for moving each pair of contact surfaces onto opposite sides of each conductor to secure the conductors between each of said pairs of contact surfaces, said manually operable means including eye bolts, angularly disposed in a common plane, and each having a threaded intermediate portion and an end portion, with one of said portions of each of said eye bolts operatively engaging with said clamp and the other of said portions engaged with means forming one of said spaced contact surfaces.

2. A portable type of clamp for temporarily securing a pair of live wire conductors or the like in parallel, predetermined, spaced relationship at a portion intermediate their ends while a permanent joint is made therebetween, said clamp comprising a shoulder having separate contact surfaces on opposite sides for separately engaging with a conductor and for predetermining the minimum spacing between the conductors, separate means on said clamp for forming contact surfaces on opposite sides of said shoulder in opposed spaced relation to said first mentioned contact surfaces for forming pairs of opposed spaced contact surfaces for receiving therebetween the separate conductors, means on said clamp including manually operated adjustment means for independently varying the spacing between said opposed pairs of spaced opposed contact surfaces for selectively clamping a conductor therebetween, said manual means including eye bolts angularly disposed in a common plane having a threaded intermediate portion and an end portion with one of said portions operatively engaged with said clamp and the other said portion engaged with said separate means.

References Cited in the file of this patent

UNITED STATES PATENTS

| | | |
|---|---|---|
| 1,964,511 | Grover | June 26, 1934 |
| 2,235,274 | Trehern | Mar. 18, 1941 |
| 2,283,061 | Hendley | May 12, 1942 |
| 2,319,602 | Hendley | May 18, 1943 |
| 2,469,542 | Becker | May 10, 1949 |
| 2,514,474 | Cook | July 11, 1950 |
| 2,631,346 | Wengen et al. | Mar. 17, 1953 |
| 2,699,190 | Packer | Jan. 11, 1955 |
| 2,811,703 | Becker | Oct. 29, 1957 |
| 2,858,522 | Wengen et al. | Oct. 28, 1958 |